Jan. 29, 1957     O. MUSGRAVE     2,779,147

POWER DRIVEN ROTARY CUTTER TRAILER ASSEMBLY

Filed April 15, 1954     2 Sheets-Sheet 1

INVENTOR.
ORLY MUSGRAVE
BY Toulmin & Toulmin
ATTORNEYS

Jan. 29, 1957   O. MUSGRAVE   2,779,147
POWER DRIVEN ROTARY CUTTER TRAILER ASSEMBLY
Filed April 15, 1954   2 Sheets-Sheet 2

INVENTOR.
ORLY MUSGRAVE
BY Toulmin & Toulmin
ATTORNEYS

United States Patent Office 2,779,147
Patented Jan. 29, 1957

2,779,147

POWER DRIVEN ROTARY CUTTER TRAILER ASSEMBLY

Orly Musgrave, Springfield, Ohio

Application April 15, 1954, Serial No. 423,316

7 Claims. (Cl. 56—25.4)

My present invention relates to apparatus for mowing and is particularly concerned with equipment for the mowing of parks, estates and such, where large areas of lawn are required to be maintained trimmed.

A primary object of the invention is the provision of a novel trailer for combination with a lawn tractor, the trailer having cutting elements or blades which are powered independently of the tractor.

A further object of the invention is the provision of a wheeled trailer for use in combination with a lawn tractor, which trailer carries cutting elements so arranged with respect to each other as to provide a cutting swath of substantially continuous width.

An important object of the invention is the provision of a trailer in combination with a lawn tractor each having cutting elements so related to each other that a wide clean swath is cut by the combined units.

Another object of the invention is the provision of a trailer in combination with a lawn tractor which trailer and tractor in combination are readily maneuverable, the trailer being constructed to approach closely to obstacles and to effect cutting around the same.

An important object of the invention is to provide a trailer for combination with a lawn tractor which trailer provides means for materially increasing the cutting swath while it itself is relatively inexpensive to manufacture and accordingly may be sold at a price which is within the reach of those who maintain large lawns and so forth in a trimmed condition.

Yet another object of this invention is to provide a wheeled trailer having the supporting wheels and cutting equipment thereof so arranged that cuts may be taken on an incline and over the top thereof without scarfing the lawn at the crest.

The invention will be more fully understood by reference to the following detailed description and accompanying drawings wherein.

Figure 1:
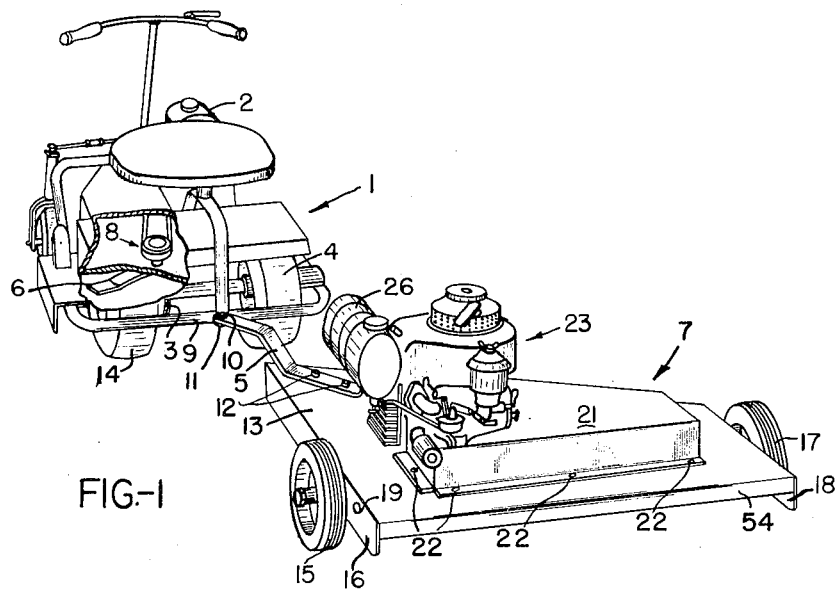
Figure 1 is a rear perspective view of a lawn tractor and trailer in combination with parts broken away and shown in section.

Referring to the drawings there is shown generally at 1 in Figure 1 a lawn tractor provided at 2 with a gasoline engine which supplies power through mechanism including chain 3 to the rear wheels 4 and 14 of the tractor for towing through rigid connector 5 the mowing trailer indicated generally at 7.

Tractor 1 is suitably provided at 6 with a rotatable cutting element mounted for horizontal rotation and powered from the engine through appropriate connecting mechanism indicated generally at 8.

The connector 5 extends from tractor 1 most suitably at an angle of about 45 degrees with respect to the longitudinal center line of the tractor and is provided with an aperture which corresponds to an aperture on the frame member 9 of the tractor and through which apertures the headed bolt 10 passes to be retained by nut 11. The outer end of connector 5 is suitably bolted at 12 to the sheet metal platform 13 of the trailer 7, thus securely affixing the tractor and trailer in combination. The trailer extends from the tractor in one direction only and this materially facilitates the maneuverability of the combination.

Platform 13 is preferably supported only by a pair of ground wheels 15, 17 journaled in depending flanges 16, 18 of the platform. These wheels are in opposed relation (Figure 3) and support the platform at a desired height above the ground; the particular height is appropriately selected within limits by providing in the depending flanges at suitable locations apertures such as 19 (Figure 1) through which the wheels are alternatively positionable, thus permitting raising or lowering the platform height with respect to the ground within minor limits.

Figure 2:
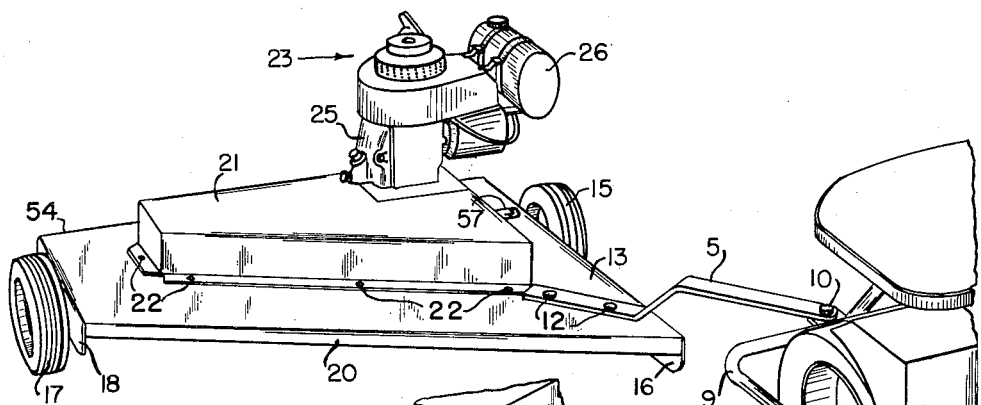
Figure 2 is an enlarged frontal perspective view of the trailer of Figure 1.

The forward edge 20 (Figure 2) of platform 13 is cut out or formed on a bias angle which permits the unit to readily clear obstructions, to reduce the overall weight of the unit and to provide for ready accessibility to the cutting blades of the trailer, as noted more particularly hereinafter. Further the projecting forward portion of the platform extends closely to the tractor for being rigidly secured thereto.

Suitably secured on the platform in any conventional manner as by nuts and bolts indicated at 22 (Figs. 1 and 2) is a sheet metal housing 21 of the same general shape in plan view as the platform. A power source indicated generally at 23 is supported on the rear end of housing 21 and the source includes a gas engine 25 and a fuel tank 26 therefor, the fuel tank overhanging the housing. This engine assembly is of standard construction and accordingly it is not considered necessary to specifically describe the component parts or to detail the operation thereof other than the parts cooperate with the inventive arrangement.

It is preferable that the engine be of the recoil-start type although such is not vital. However, it is to be noted that the engine and assembly are located with the center of gravity thereof very nearly on the center line and preferably just slightly aft of the center line of the wheels and off the fore and aft center line of the trailer in the direction of the tractor (Figure 1). Thus the weight is so positioned as to reduce inertia effects in starting and stopping the assembly, to allow for sharp turning, and to permit pivotal movement upwardly on the forward end of the platform about the wheel's axes when the tractor is on a slight incline. Further by detaching the rigid bar 5 from the tractor the forward platform end may be pivoted about the wheel's axes to expose the under portions of the platform.

Figure 3:
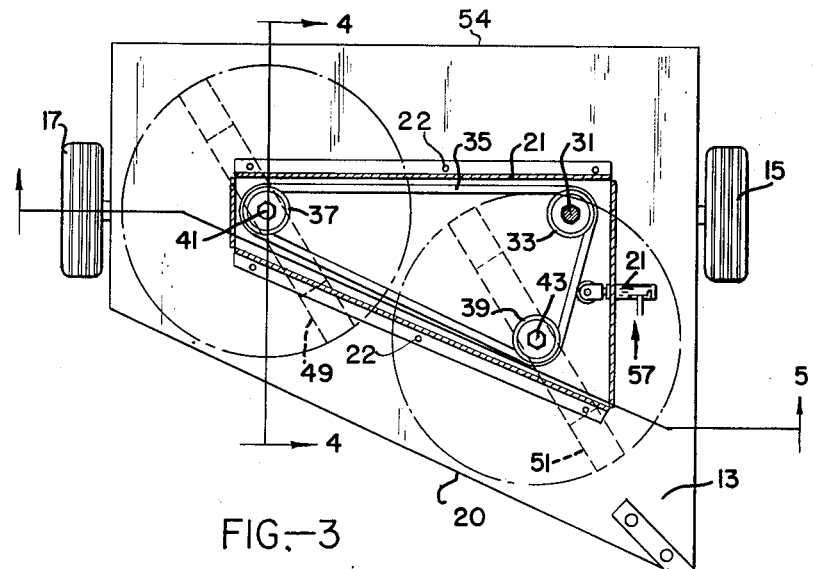
Figure 3 is a plan view on a further enlarged scale of the trailer of Figure 1 with portions broken away and shown in section to show the operative mechanism of the trailer.
Figure 4:
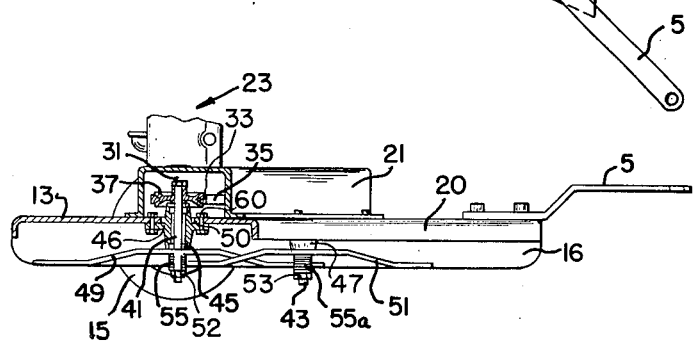
Figure 4 is a fragmentary sectional view of the device taken on line 4—4 of Figure 3.
Figure 5:
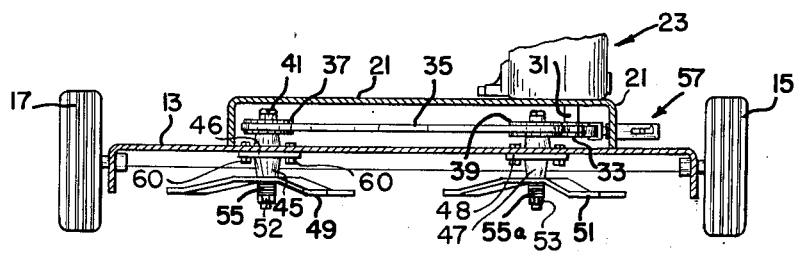
Figure 5 is a fragmentary sectional view of the device taken on line 5—5 of Figure 3.

Referring now particularly to Figures 3–5, inclusive, it is seen that the motor shaft 31 (Figure 4) is provided with a V-shaped pulley 33 about which V-belt 35 passes to engage pulleys 37, 39 (Figure 3). The pulleys 37, 39 are each secured respectively on vertically extending shafts 41, 43 which are retained by bearings in housings 45, 47 (Figures 4 and 5) having respectively flanges 46, 48, which are secured to the platform under the housing 21. Bolts as indicated at 50 pass through a flange and the platform and nuts on the bolts as at 60 retain the housing and platform together.

The shafts 41, 43 each are threaded at their lower ends and have retained thereon horizontally rotatable cutting elements or blades 49, 51. Nuts 52, 53 retain the cutting elements for rotation with the shaft and also permit the blades to be easily removed for sharpening. Sharpening may also be effected with the blades in position by simply pivoting the forward end or edge 20 of the platform 13 upwardly on the wheels and the cutout forward end of the platform permits ready access to the blades for this procedure.

The vertically extending shaft 41 is mounted on the platform 13 substantially in a straight line between the axes of the opposed wheels 15, 17 somewhat toward the aft end 54 and is well rearwardly of shaft 43. Preferably the shaft 41, motor shaft 31 and the wheel centers define a straight line across the platform and are about one-third of the distance between the aft end 54 and the extreme forward edge of the platform.

The cutting elements 49, 51 are rotary suction type blades each have outer sharpened substantially planar extending end portions and each being cupped upwardly centrally to provide the suction effect. The blades in their rotation as indicated by the circles in dotted lines (Figure 3) are arranged to provide overlapping cutting swaths and the suction effect across the platform width is substantially continuous and effective to draw the cut grass towards the wheel 17 in the forward motion of the assembly.

In this connection it is to be noted that leaf mulcher attachments may be provided above the blades if so desired; otherwise the assembly as described is effective to provide a windrow adjacent flange 18.

Metal washers indicated at 55 and 55a are provided on the shafts and are useful to position the heights of the blades exactly as desired for particular circumstances of cutting. Thus some of the washers may be above the blades and others below to secure precise adjustment.

Figure 6:
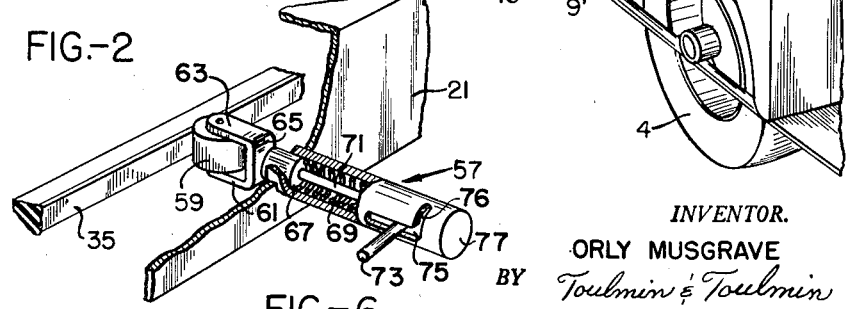
Figure 6 is an enlarged detailed view of a portion of the structure of Figure 3 with parts broken away and shown in section.

The numeral 57 (Figure 6) designates a spring loaded belt tightener which is supported by the housing 21 and carries at its inner end a rotatably supported pulley shown at 59 (Figure 3). The pulley bears against the belt 35 and provides for tightening of the same when the device is in use; the pulley is rotatably supported between arms 61, 63 of fork 65 which is secured to a bearing block 67 for the spring 69. Shaft 71 extends from block 67 and carries at its other end a laterally extending rod 73 which passes outward through a bayonet-type slot 75 of housing 77. The pulley 59 may be retracted manually against the pressure of the spring 69 when the structure is not in use or when adjustment is required by drawing the rod 73 backwardly into the short arm 76 of slot 75.

In specific application it has been found that for most purposes an overall trailer width of about 44 inches in which the trailer carries blades overlapping in their cutting swath to the extent of about 1 inch and having themselves a length of 18 inches is entirely suitable. This permits the blades to approach closely, within an inch, of the depending flanges of the platform, and the blade 51 which is nearest the center line of the tractor and is overlapped by blade 6 will provide, in combination with the tractor blade 6, means for cutting a complete swath. The total swath cut is, for example, about 53 inches in width.

Each of the gasoline engines described in connection with the combination is suitably of about 2½ horse power, air cooled, and of the 4-cycle type, which are readily available commercially. Operational speeds of 2200–4000 R. P. M. are entirely appropriate for the engine 23 and all of the pulleys of the trailer unit are relatively small, being about 3 inches in diameter.

The trailer is so arranged that the blades will remain parallel with the ground under substantially all conditions of operation and the grass is trimmable as closely as desired; in moving up an incline onto a flat surface no scarfing or cutting of the crest takes place as the wheels and blades are so arranged with respect to each other that the blades easily clear on substantially any usual incline, the wheels being positioned not further forwardly than about the vertical center line of shaft 41 and well rearwardly of the forward cutting extension of the horizontally rotating blades.

It will be understood that this invention is susceptible to modification in order to adopt it to different usages and conditions and accordingly, it is desired to comprehend such modifications within this invention as may fall within the scope of the appended claims.

I claim:

1. A mowing trailer for combination with a lawn tractor comprising: a horizontally extending platform having a longer forward side and parallel lateral sides of unequal length; two opposed ground wheels, one on either side of the platform secured to the platform intermediate the length of and supporting the platform; a housing on the platform extending laterally thereof between the wheels; a power source mounted on the housing and extending thereabove, the power source being positioned laterally of the longitudinal center line of the trailer adjacent the longer of the parallel sides; horizontally rotatable cutting elements beneath the platform and disposed laterally in adjacent staggered relation, one cutting element being disposed forwardly of an adjacent cutting element to provide in its rotation a cut swath which overlaps the cut swath of an adjacent element; support means secured to the platform for retaining the rotatable cutting elements; means in the housing drivingly connecting the power source with the cutting elements, the wheels and power source being positioned on the platform rearwardly and in substantial alignment laterally.

2. A mowing trailer for combination with a lawn tractor comprising: a horizontally extending platform having a longer forward side and parallel lateral sides of unequal length; two opposed ground wheels, one on either side of the platform secured thereto intermediate the length thereof and supporting the platform; a housing on the platform extending laterally thereof between the wheels; a power source mounted on the housing and extending thereabove, the power source being positioned laterally of the longitudinal center line of the trailer adjacent the longer of the parallel sides; a pair of cutting elements beneath the platform secured laterally of each other in the same horizontal plane, one element being disposed forwardly of the other to provide in its rotation a cut swath which overlaps the cut swath of the other element, said cutting elements being suction type blades; support means secured to the platform for retaining the cutting elements; and means including means in the housing drivingly connecting the power source with the cutting elements.

3. In a mowing trailer for combination with a lawn tractor; a substantially horizontal platform of trapezoidal shape having a longer forward side and parallel lateral sides of unequal length, the parallel lateral sides having depending flanges; a pair of opposed wheels, one journaled in a flange on either side of the platform supporting the same; a pair of horizontally rotatable cutting elements beneath the platform supported therefrom well rearwardly of the forward side; means including a power source carried by the trailer operatively connected to drive the cutting elements, the cutting elements being supported laterally of each other, and one forwardly of the other, and arranged to cut swaths which overlap slightly, said cutting elements being each such type cutting blades, and the forward one of the elements being positioned closer to the juncture of the longer parallel side and the forward side.

4. A mowing trailer for combination with a lawn tractor comprising: a platform of trapezoidal shape having a longer forward side and parallel lateral sides of unequal length; two opposed ground wheels, one on either side of the platform intermediate the length thereof, secured thereto and supporting the platform; a housing on the platform extending laterally thereof between the wheels; a power source mounted on the housing and extending thereabove, the power source being positioned laterally of the longitudinal center line of the trailer adjacent the longer of the lateral sides of the platform; cutting elements supported by the platform beneath the same and disposed laterally in adjacent staggered relation, one cutting element being disposed forwardly of an adjacent cutting element to provide in its rotation a cut swath which overlaps the cut swath of the adjacent element; and means including means in the housing drivingly connecting the power source with the cutting elements.

5. A mowing trailer for combination with a lawn tractor comprising: a platform; two opposed ground wheels, one on either side of the platform intermediate the length thereof, secured thereto and supporting the platform; a housing on the platform extending laterally thereof between the wheels; a power source mounted on the housing and extending thereabove; horizontally rotatable cutting elements supported by the platform beneath the same, one cutting element being disposed forwardly of an adjacent cutting element to provide in its rotation a cut swath which overlaps the cut swath of the adjacent element, and means including means in the housing drivingly connecting the power source with the cutting elements.

6. A mowing trailer for combination with a lawn tractor comprising: a platform; two opposed ground wheels, one on either side of the platform intermediate the length thereof, secured thereto and supporting the platform; a housing on the platform extending laterally thereof between the wheels; a power source mounted on the housing and extending thereabove, the power source being positioned laterally of the center line of the trailer; horizontally rotatable cutting elements supported by the platform beneath the same, one cutting element being disposed forwardly of an adjacent cutting element to provide in its rotation a cut swath which overlaps the cut swath of the adjacent element; and means including means in the housing drivingly connecting the power source with the cutting elements.

7. A mowing trailer for combination with a lawn tractor comprising: a platform; two opposed ground wheels, one on either side of the platform intermediate the length thereof, secured thereto and supporting the platform; a housing on the platform extending laterally thereof between the wheels; a power source mounted on the housing and extending thereabove, the power source being positioned laterally of the center line of the trailer; horizontally rotatable cutting elements supported by the platform beneath the same, one cutting element being disposed forwardly of an adjacent cutting element to provide in its rotation a cut swath which overlaps the cut swath of the adjacent element, means includings means in the housing drivingly connecting the power source with the cutting elements, and connector means carried by the trailer forwardly on the same side of the platform as the power source for securing the tractor to a trailer.

References Cited in the file of this patent

UNITED STATES PATENTS

| | | |
|---|---|---|
| 1,819,587 | Benjamin et al. | Aug. 18, 1931 |
| 1,825,109 | Worthington | Sept. 29, 1931 |
| 2,204,244 | Bishop et al. | June 11, 1940 |
| 2,229,363 | Bishop | Jan. 21, 1941 |
| 2,489,204 | Sprick et al. | Nov. 22, 1949 |
| 2,603,050 | Scheer | July 15, 1952 |
| 2,620,612 | De Eugenio | Dec. 9, 1952 |
| 2,659,445 | Church | Nov. 17, 1953 |
| 2,682,740 | Miller et al. | July 6, 1954 |
| 2,706,879 | Barrentine | Apr. 26, 1955 |
| 2,710,514 | Broussard | June 14, 1955 |
| 2,712,358 | Kuhary et al. | July 5, 1955 |
| 2,721,434 | Frances et al. | Oct. 25, 1955 |

OTHER REFERENCES

Farm Implement News, May 19, 1949, page 46.